United States Patent
Zakaria et al.

(10) Patent No.: US 11,585,196 B2
(45) Date of Patent: Feb. 21, 2023

(54) METHODS OF USING ENERGIZED WELL TREATING FLUIDS

(71) Applicant: BAKER HUGHES OILFIELD OPERATIONS LLC, Houston, TX (US)

(72) Inventors: Ahmed Zakaria, Houston, TX (US); John Mayor, Cypress, TX (US); D. V. Satyanarayana Gupta, The Woodlands, TX (US); Minh Quoc Vo, Spring, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 117 days.

(21) Appl. No.: 17/065,758

(22) Filed: Oct. 8, 2020

(65) Prior Publication Data

US 2021/0123333 A1   Apr. 29, 2021

Related U.S. Application Data

(60) Provisional application No. 62/924,918, filed on Oct. 23, 2019.

(51) Int. Cl.
*E21B 43/26* (2006.01)
*C09K 8/68* (2006.01)

(52) U.S. Cl.
CPC ............... *E21B 43/26* (2013.01); *C09K 8/68* (2013.01)

(58) Field of Classification Search
CPC .................................. E21B 43/26; C09K 8/68
See application file for complete search history.

(56) References Cited

U.S. PATENT DOCUMENTS

| | | | |
|---|---|---|---|
| 4,466,893 | A | 8/1984 | Dill |
| 6,572,789 | B1 | 6/2003 | Yang et al. |
| 6,737,386 | B1 | 5/2004 | Moorhouse et al. |
| 6,794,524 | B1 | 9/2004 | Imperante et al. |
| 7,094,738 | B2 | 8/2006 | Patel et al. |
| 2005/0054540 | A1 | 3/2005 | Patel et al. |

(Continued)

FOREIGN PATENT DOCUMENTS

| | | |
|---|---|---|
| CN | 108018035 A | 5/2018 |
| DE | 102009001559 A1 | 12/2009 |

(Continued)

OTHER PUBLICATIONS

Ranka, M.A., "Conformational Investigations of Model Polyzwitterion and Its Applications in Oil Recovery"; submitted to the Department of Chemical Engineering on Apr. 26, 2017 at MIT (114 pgs).

(Continued)

*Primary Examiner* — Crystal J. Lee
(74) *Attorney, Agent, or Firm* — John Wilson Jones; Jones Delflache LLP (57) ABSTRACT

A fluid for use in hydraulic fracturing contains underivatized guar or a guar gum derivative as viscosifying or gelling polymer, a crosslinking agent, carbon dioxide as foaming agent and urea and, optionally, a bifunctional organic compound containing at least one hydroxyl group and at least one quaternary group and, optionally, a non-gaseous foaming agent. The fluid may be characterized by a low pH such as a pH than or equal to 3.0 and less than or equal to 5.0.

20 Claims, 2 Drawing Sheets

(56) References Cited

U.S. PATENT DOCUMENTS

| | | |
|---|---|---|
| 2005/0124738 A1 | 6/2005 | Sivik et al. |
| 2005/0126786 A1 | 6/2005 | Fu et al. |
| 2006/0116296 A1* | 6/2006 | Kippie .................... C09K 8/12 |
| | | 507/244 |
| 2006/0131022 A1 | 6/2006 | Rae et al. |
| 2008/0004187 A1 | 1/2008 | Pena et al. |
| 2008/0234147 A1* | 9/2008 | Li .......................... C09K 8/887 |
| | | 507/215 |
| 2011/0130312 A1 | 6/2011 | Notte et al. |
| 2015/0013984 A1 | 1/2015 | Abivin et al. |
| 2015/0344771 A1 | 12/2015 | Jiang et al. |
| 2016/0177170 A1 | 6/2016 | Janak et al. |
| 2016/0177693 A1* | 6/2016 | Gomaa .................... C09K 8/90 |
| | | 166/305.1 |
| 2016/0288045 A1 | 10/2016 | Kramer et al. |
| 2016/0298024 A1 | 10/2016 | Panga et al. |
| 2018/0244982 A1 | 8/2018 | Yakovlev et al. |
| 2018/0265808 A1 | 9/2018 | Gross |
| 2018/0305601 A1 | 10/2018 | Champagne et al. |
| 2018/0346798 A1 | 12/2018 | Abdel-Fattah et al. |
| 2019/0382649 A1 | 12/2019 | Jiang et al. |
| 2020/0399530 A1 | 12/2020 | Zakaria et al. |

FOREIGN PATENT DOCUMENTS

| | | |
|---|---|---|
| GB | 2304754 A | 3/1997 |
| WO | 2005103218 A1 | 11/2005 |
| WO | 2014004697 A2 | 1/2014 |
| WO | 2015120990 A1 | 8/2015 |
| WO | 2017040553 A1 | 3/2017 |
| WO | 2018115635 A1 | 6/2018 |

OTHER PUBLICATIONS

International Search Report and Written Opinion for PCT/US2020/054725 dated Jan. 28, 2021.

* cited by examiner

METHODS OF USING ENERGIZED WELL TREATING FLUIDS

This application claims the benefit of U.S. provisional application Ser. No. 62/924,918, filed on Oct. 23, 2019.

FIELD

The disclosure relates to a fluid and a method of stimulating a subterranean formation with the fluid, the fluid containing guar gum or a derivative thereof, crosslinking agent, carbon dioxide as foaming gas, urea and, optionally (i) a bifunctional organic compound having at least one hydroxyl group and at least one quaternary group and/or (ii) a non-gaseous foaming agent.

BACKGROUND

Hydraulic fracturing is the process of enhancing oil and/or gas production from producing wells or enhancing the injection of water or other fluids into injection wells. Typically, a fracturing fluid is injected into the well, passing down the tubulars to the subterranean formation penetrated by the wellbore.

The fluid is then pumped at rates and pressures that exceed the confining stresses in the formation. This creates or enlarges cracks or fissures in the formation which extend away from the wellbore. As more fluid is injected, the fracture may continue to expand. The fracturing fluid may contain propping agents which are carried to the fracture and placed in the growing crack; the viscosity of such fluids being sufficient to adequately carry and place proppant into the formation.

Often, the fracturing fluid is composed of at least one water-soluble polymer which has been hydrated in water and which has been chemically modified with a crosslinking agent in order to increase fluid viscosity. Typical water-soluble polymers for use in fracturing fluids are those based on guar gum and include guar derivatives. Typical crosslinking agents are typically metallic and include organometallics. Such viscosified fluids form three-dimensional gels.

Certain subterranean formations subjected to hydraulic fracturing are water sensitive. For instance, formations rich in swellable and migrating clays are water sensitive due to the presence of kaolinite, chlorite, illite and mixed layers of illite and smectite. Imbibed water increases the potential for damage to the formation.

Formation damage further results when aqueous based fracturing fluids are used due to adverse water saturation effects (including sub-irreducible water saturation). Saturation of the formation with water typically reduces permeability to hydrocarbons. This, in turn, can reduce productivity of the well.

Water retention issues may be especially acute in tight gas formations which are water-wet and under-saturated where the initial water saturation in the reservoir is less than the capillary equilibrium irreducible water saturation. When exposed to aqueous based fluids, these formations trap water for long periods of time, if not permanently, especially in near-wellbore regions. As such, in certain formations, such as shale, flow back of 25 to 40 weight percent of fracturing water must be addressed prior to putting produced gas in the pipeline.

Fluids are typically energized with gases, such as nitrogen and carbon dioxide, to minimize the amount of liquids introduced into the formation and to enhance recovery of fluids from the well. In some cases, a mixture of such gases may be used. A mixture of two of such gases is referred to as a binary fluid. Typically, fluids are considered energized if the volume percent of the energizing medium to the total volume of the treatment fluid (defined as "quality") is less than 53%; they are considered as foams if the volume percent is greater than 53%. By minimizing the amount of water in the fracturing fluid, energized or foamed fluids minimize concerns of flowback water as well as the adverse effects caused by water retention. Further, energized and foamed fluids are useful at wellsites were water availability is limited.

Energized and foamed fracturing fluids are known, however, to be unstable in high temperature wells, such as wells having a formation temperature greater than 225° F. as evidenced by premature breakage of the crosslinked polymer. Such breakage decreases the viscosity and thus the stability of the fluid. For instance, in carbon dioxide energized and foamed fracturing fluids, carbonic acid forms when carbon dioxide is dissolved in water. Carbonic acid is known to degrade the crosslinked polymer.

It is desired therefore to develop a method of fracturing a formation using an energized or foamed fracturing fluid which is stable in wells having a formation temperature in excess of 225° F.

SUMMARY

In an embodiment, a fluid for treating a wellbore is provided, the fluid containing an underivatized guar and a guar gum derivative selected from carboxyalkyl guars, hydroxyalkylated guars, modified hydroxyalkylated guars and mixtures thereof; a crosslinking agent; a foaming gas; and urea. The fluid may contain a non-gaseous foaming agent and/or bifunctional organic compound containing at least one hydroxyl group and at least one quaternary ammonium group.

In another embodiment, a method of fracturing a subterranean formation is provided wherein a fluid of the paragraph above is introduced into a well and a fracture is created or enlarged in the formation.

In another embodiment, a method of fracturing a subterranean formation is provided wherein the fluid of the paragraph above is pumped into a well under pressure and one or more fractures are created or enlarged in the subterranean formation. During or subsequent to pumping the fluid into the well a viscous gel is formed by crosslinking the guar gum or derivative with the crosslinking agent. Hydrolysis of the crosslinked polymer by carbonic acid generated from the carbon dioxide is decreased by the presence of the urea. Potential for transport of disassociated hydrogen protons from carbonic acid to the crosslinked viscous gel is markedly decreased and degradation of the crosslinked viscous gel is inhibited. Typically, the temperature in the well is greater than or equal to 250° F.

DETAILED DESCRIPTION

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein, being of exemplary embodiments, is not intended to limit the claims. On the contrary, the intention is to cover all modifications, equivalents and alternatives falling within the spirit and scope of the claims. A person of ordinary skill in the art will understand that the embodiments of the disclosure may be practiced without employing all of the specific details and that embodiments of the disclosure may be practiced in conjunction with conventional techniques employed in the industry.

The terms "including" and "comprising" are used herein and in the appended claims in an open-ended fashion, and thus should be interpreted to mean "including, but not limited to . . . ."

Further, reference herein and in the appended claims to components and aspects in a singular tense does not necessarily limit the present disclosure or appended claims to only one such component or aspect, but should be interpreted generally to mean one or more, as may be suitable and desirable in each particular instance.

The use of the terms "a" and "an" and "the" and similar referents (especially in the context of the following claims) are to be construed to cover both the singular and the plural, unless otherwise indicated herein or clearly contradicted by context.

All ranges disclosed herein are inclusive of the endpoints. A numerical range having a lower endpoint and an upper endpoint shall further encompass any number and any range falling within the lower endpoint and the upper endpoint. For example, every range of values (in the form "from a to b" or "from about a to about b" or "from about a to b," "from approximately a to b," "between about a and about b," and any similar expressions, where "a" and "b" represent numerical values of degree or measurement is to be understood to set forth every number and range encompassed within the broader range of values and inclusive of the endpoints.

The suffix "(s)" as used herein is intended to include both the singular and the plural of the term that it modifies, thereby including at least one of that term (e.g., the colorant(s) includes at least one colorants). As used herein, "combination" is inclusive of blends, mixtures, reaction products, and the like.

All references are incorporated herein by reference.

A fluid is provided which may be used to enhance productivity of a hydrocarbon-bearing formation. The fluid is particularly useful in the hydraulic fracturing of a subterranean formation penetrated by a well.

The fluid contains an underivatized guar or a guar gum derivative as a hydratable viscosifying or gelling polymer, a crosslinking agent, foaming gas and urea.

While the foam quality of the fluid may be greater than 53% by volume, the fluid is more typically an energized fluid (containing less than 53% by volume gas). The aqueous phase of the fluid includes the viscosifying or gelling polymer, urea, crosslinking agent, the optional bifunctional organic compound and the optional non-gaseous foaming agent.

The urea may be referred to as an "enhancer" since it disrupts the hydrogen bond network of the water in the fluid and thus limits the transport of hydrogen protons disassociated from the carbonic acid. In the absence of the enhancer, the crosslinked polymer is degraded and the stability of the fluid is severely weakened. As a result, fluids substantially similar to those of the fluids described herein (but void of urea) cannot be used at formation temperatures in excess of 225° F. Degradation of the viscous gel (formed by interaction of the guar or derivative thereof and crosslinking agent) is delayed in-situ by the presence of the urea in the fluid. The urea in the fluid inhibits acid hydrolysis of the crosslinked polymer by carbonic acid (generated from the carbon dioxide foaming gas). The fluid of the disclosure may therefore be used at elevated temperatures, such as at a formation temperature of 275° F. or higher and typically at formation temperatures up to 350° F. or above.

In an optional embodiment, the enhancer may further contain a bifunctional organic compound containing at least one hydroxyl group and at least one quaternary group.

The presence of the enhancer in the fluid improves the thermal stability of the energized or foamed fluid. The fluid is more stable than a substantially similar fluid not containing the enhancer. Further, the presence of the enhancer maintains the viscosity of the fluid for longer periods of time (compared to when the enhancer is not present in the fluid).

The stability of the energized or foamed fluid is evident by the crosslinked polymer remaining intact at elevated temperatures. The fluid of the disclosure may thus permit use of gaseous fluids at higher temperatures compared to when the enhancer is not present in the fluid. In an embodiment, the energized or foamed fluid is used at formation temperatures in excess of 225° F. to 230° F., typically greater than or equal to 250° F. and typically 275° F. or higher. Typically, the use of the fluid enables the use of foamed or energized fluids at a formation temperature up to 350° F. and above.

Further, the presence of the enhancer in the fluid reduces the polymer loading as well as the crosslinker loading in the fluid (polymer and crosslinker loading being reduced compared to when the enhancer is not present in the fluid).

The amount of urea in the aqueous fluid of the energized or foam fluid is typically between from about 0.1 to about 1.0 more typically from about 0.25 to about 0.75 percent (based on the weight of the aqueous fluid). While higher amounts of urea may be used, when used in amounts in excess of 2 weight percent, no improvement may be noted.

The foaming gas is typically carbon dioxide or a mixture of carbon dioxide and nitrogen. In an embodiment, carbon dioxide is preferred.

The energized or foamed fracturing fluid described herein contains a guar based polymer viscosifying agent or gellant. The fluid may be void of more conventional and expensive synthetic polymers, such as those used in U.S. Pat. No. 8,691,734, which are normally required to treat wells exhibiting high formation temperatures.

When a guar gum derivative is used, it typically is a carboxyalkyl guar, hydroxyalkylated guar or a modified hydroxyalkylated guar (such as a carboxyhydroxyalkylated guar). Mixtures of guar gum as well as guar gum derivatives may also be used.

Exemplary of hydroxyalkylated guars are hydroxypropyl guar (HPG), hydroxyethyl guar (HEG) and hydroxybutyl guar (HBG). Preferably the hydroxyalkylated guar has a molecular weight of about 1 to about 3 million.

The carboxyalkyl group of the carboxyalkylated as well as the carboxyalkylhydroxylated guars may be carboxymethyl, carboxyethyl, carboxypropyl or carboxybutyl.

The carboxyl content of the hydratable polysaccharides is expressed as Degree of Substitution ("DS") and ranges from about 0.08 to about 0.18 and the hydroxypropyl content is expressed as Molar Substitution (MS) (defined as the number of moles of hydroxyalkyl groups per mole of anhydroglucose) and may range between from about 0.2 to about 0.6.

Carboxyalkyl guars include those which contain carboxylate groups anionically charged except in strong acid. These anionically charged groups tend to repel away from one another. The carboxyalkyl guar can be obtained in many ways, including a) using premium grade guar as the starting material to which the anionic groups are chemically added; and/or b) selecting processing parameters that provide better uniformity in placing the anionic substituents on the guar polymer backbone; and/or c) additional processing steps, including ultra-washing to remove impurities and refine the polymer. Preferred polymers include those guars having randomly distributed carboxymethyl groups.

Exemplary modified hydroxyalkylated guar derivatives include carboxyhydroxyalkylated guars like carboxyalkyl hydroxypropyl guar such as carboxymethyl hydroxypropyl guar (CMHPG). CMHPG is often preferred due to its ease of hydration, availability and tolerance to hard water.

Typically, the amount of hydratable viscosifying polymer or gellant in the fluid is between from about 15 to about 100, preferably from about 20 to about 60, more preferably from about 20 to about 40, pounds per 1,000 gallons of water in the aqueous fluid of the energized or foamed fluid.

The crosslinking agent may be a delayed crosslinking agent (in order to delay hydration of the guar gum), though other crosslinking agents may be used. In many instances, hydration may be controlled for up to 24 to 36 hours prior to forming a crosslinked polymer of sufficient viscosity to function as a gel.

The crosslinking agent is typically organometallic or an organic complexed metal ion comprising at least one transition metal or alkaline earth metal ion as well as mixtures thereof.

Exemplary crosslinking agents include those which can supply zirconium IV ions such as, for example, zirconium lactate, zirconium lactate triethanolamine, zirconium carbonate, zirconium acetylacetonate and zirconium diisopropylamine lactate; as well as compounds that can supply titanium IV ions such as, for example, titanium ammonium lactate, titanium triethanolamine, and titanium acetylacetonate. Zr (IV) and Ti (IV) may further be added directly as ions or oxy ions into the fluid.

Such organometallic and organic complexed metal crosslinking agents containing titanium or zirconium in a +4 valence state include those disclosed in British Pat. No. 2,108,122 prepared by reacting zirconium tetraalkoxides with alkanolamines under essentially anhydrous conditions. Other zirconium and titanium crosslinking agents are described, for example, in U.S. Pat. Nos. 3,888,312; 3,301,723; 4,460,751; 4,477,360; Europe Pat. No. 92,755; and U.S. Pat. No. 4,780,223. Such organometallic and organic complexed metal crosslinking agents containing titanium or zirconium in a +4 oxidation valance state may contain one or more alkanolamine ligands such as ethanolamine (mono-, di- or triethanolamine) ligands, such as bis(triethanolamine) bis(isopropyl)-titanium (IV). Further, the compounds may be supplied as inorganic oxides, such as zirconium or titanium dioxide.

Any suitable crosslinking metal ion, metal containing species, or mixture of such ions and species may further be employed. In a preferred embodiment, the crosslinking agent for use in the thermal insulating fluid of the disclosure are reagents capable of providing Zn (II), calcium, magnesium, aluminum, Fe (II), and Fe (III) to the fluid. These may be applied directly to the fluid as ions or as polyvalent metallic compounds such as hydroxides and chlorides from which the ions may be released.

The crosslinking ions or species may be provided, as indicated, by dissolving into the solution compounds containing the appropriate metals or the metal ion per se. Such crosslinking agents significantly increase the fluid viscosity at higher temperature. Alcohol, such as ethanol or propanol, may be used to form the solution. For instance, a metallic complex of a metal and an alkanolamine (like triethanolamine) may be used, including commercial organic zirconate complexes consisting of zirconium metal and an alkanol amine, such as triethanolamine. The amount of metal in the solution may can range from 15 ppm to 4910 ppm (as metal oxide). The weight ratio of crosslinking agent in the alcohol solvent is typically between from about 40% to about 70%.

The amount of crosslinking agent present in the aqueous fluid (i.e., the aqueous fluid of the energized or foam fluid) is that amount required to effectuate gelation or viscosification of the fluid at or near the downhole temperature of the targeted area, typically between from about 0.5 gpt to about 5 gpt based on the liquid volume of the aqueous fluid.

When used in combination with the bifunctional organic compound, the weight percent/volume percent of urea to bifunctional organic compound is typically between from about 0.05:1.25, typically between from about 0.0625:1, more typically from about 0.4:0.6.

The bifunctional organic compounds contains both quaternary ammonium and hydroxy groups. Suitable bifunctional organic compounds include hydroxyalkyl ammonium salts such as hydroxyethyl ammonium salts like trimethyl hydroxyethyl ammonium chloride and choline chloride as well as hydroxy ammonium salts of five to nine carbon atoms like bis(hydroxyethyl)dimethyl ammonium chloride and salts of the structure (I):

R = ethyl, butyl, hexyl, dodecyl, octadecyl and n is from about 1 to about 3 and preferably is 1.

In a preferred embodiment, the bifunctional organic compound is choline chloride.

In addition to halide salts, the bifunctional organic compound containing at least one quaternary ammonium and an alcohol moiety may be another salt, such as salt of a sulfonate. Exemplary of such salts are the tris hydroxyalkyl ammonium sulfates, especially those containing from five to 9 carbon atoms like tris(2-hydroxyethyl)methylammonium methyl sulfate.

Other exemplary bifunctional organic compounds include bis(2-hydroxyethyl)dimethylammonium methyl sulfonate; choline acetate and choline salicylate.

The pH of the fluid is typically greater than or equal to 3.0 and less than or equal to 6.0, more typically from about 3.6 to about 4.9, even more typically from about 4.0 to about 4.8 including from about 4.45 to about 4.8.

In some instances, it may be desirable to add a non-gaseous foaming agent to the fluid. Such agents often contribute to the stability of the fluid and typically increase the viscosity of the fluid.

The non-gaseous foaming agent may be amphoteric, cationic or anionic. Suitable amphoteric surfactants include alkyl betaines, alkyl sultaines and alkyl carboxylates.

Suitable anionic surfactants include sulfate ethers, alkyl ether sulfates, ethoxylated ether sulfates, ethoxylated alcohol ether sulfates, phosphate esters, alkyl ether phosphates, ethoxylated alcohol phosphate esters, alkyl sulfates and alpha olefin sulfonates and salts (including metal and ammonium salts) thereof. Preferred as alpha-olefin sulfonates are salts of a monovalent cation such as an alkali metal ion like sodium, lithium or potassium, an ammonium ion or an alkyl-substituent or hydroxyalkyl substitute ammonium in which the alkyl substituents may contain from 1 to 3 carbon atoms in each substituent. The alpha-olefin moiety typically has from 12 to 16 carbon atoms.

Preferred alkyl ether sulfates are salts of the monovalent cations referenced above. The alkyl ether sulfate may be an alkyl polyether sulfate and contains from 8 to 16 carbon atoms in the alkyl ether moiety. Preferred as anionic surfactants are sodium lauryl ether sulfate (2-3 moles ethylene oxide), $C_8$-$C_{10}$ ammonium ether sulfate (2-3 moles ethylene oxide) and a $C_{14}$-$C_{16}$ sodium alpha-olefin sulfonate and mixtures thereof. Especially preferred are ammonium ether sulfates.

Suitable cationic surfactants include alkyl quaternary ammonium salts, alkyl benzyl quaternary ammonium salts and alkyl amido amine quaternary ammonium salts.

In some instances, preferred foaming agents include alkyl ether sulfates, alkoxylated ether sulfates, phosphate esters, alkyl ether phosphates, alkoxylated alcohol phosphate esters, alkyl sulfates and alpha olefin sulfonates.

The fluid may further contain a proppant. Suitable proppants include those conventionally known in the art including quartz, sand grains, bauxite, glass beads, aluminum pellets, ceramics, plastic beads and ultra lightweight (ULW) particulates [having an apparent specific gravity (ASG) less than or equal to 2.45, often less than or equal to 2.25, and often less than or equal to 2.0 or less than or equal to 1.75 or less than or equal to 1.25. Exemplary ULW particulates include ground or crushed shells of nuts like walnut, coconut, pecan, almond, ivory nut, brazil nut, etc.; ground and crushed seed shells (including fruit pits) of seeds of fruits such as plum, olive, peach, cherry, apricot, etc.; ground and crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particalization, processing, etc.

When present, the amount of proppant in the fluid is typically between from about 0.5 to about 12.0, preferably between from about 1 to about 8.0, pounds of proppant per gallon of the aqueous fluid in the energized or foamed fluid.

The fluid may further contain conventional additives including one or more of biocides, gel stabilizers, scale inhibitors, gas hydrate inhibitors, clay stabilizers, flowback surfactants, corrosion inhibitors, etc. The addition of such additives to the fluid minimizes the need for additional pumps required to add such materials on the fly.

Typically, the fluid is free of a breaker. A breaker may, if desired, be included in the fluid to break down the viscosifying polymer to reduce formation damage (such as filter cake) and to reduce the amount of polymeric gel residue in the formation. The breaker may further improve flowback of fluids from the created or enlarged fractures. Any conventional breaker may be used. Examples of suitable materials include, but are not limited to, oxidizing agents, amines like triethanolamines, organic and inorganic acids (such as hydrochloric acid, acetic acid, formic acid, polyglycolic acid and sulfamic acid), acid salts (such as sodium bisulfate), acid-producing materials, oxidizing agents (like alkaline earth peroxides such as calcium peroxide, persulfates such as ammonium persulfate, organic peroxides, sodium perborate and a hydrochlorite bleach.

The breaker may also be encapsulated. In an embodiment, the breaker is an encapsulated percarbonate, perchlorate, peracid, peroxide, or persulfate. Exemplary encapsulated breakers include those oxide or peroxide breaker encapsulated in an inert porous encapsulant, such as those disclosed in U.S. Pat. No. 6,184,184. When present, the gelled emulsion may contain between from about 0.2 to about 30, more typically between from about 2 to about 25, kg/m$^3$ of oxidative or acidic breaker.

In an embodiment, the breaker may be an enzyme breaker. Typically, the enzyme breaker system is a mixture of highly specific enzymes capable of degrading the backbone of the crosslinked polymer.

The fluid is of great benefit to low pressurized reservoir wells since it enhances oil pressure and thus increases productivity of the well.

The fluid described herein may further be used in a sand control treatment operation of a gas producing well. The "proppant" referenced herein would be used as the sand control particulate. In one exemplary embodiment, a gravel pack operation may be carried out on a wellbore that penetrates a subterranean formation to prevent or substantially reduce the production of formation particles into the wellbore from the formation during gas production. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. The energized or foamed fluid containing the sand control particulate may be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during the production of gas from the formation, while at the same time allowing passage of formation fluids from the subterranean formation through the screen into the wellbore.

As an alternative to use of a screen, the sand control method may use lightweight particulates and/or substantially neutrally buoyant particulates to form a pack of particulate material within the wellbore to substantially prevent or reduce production of formation materials, such as formation sand, from the formation into the wellbore. Such methods may or may not employ a gravel pack screen, may be introduced into a wellbore at pressures below, at or above the fracturing pressure of the formation, such as frac pack.

The liquid phase of the energized or foamed fluid may be prepared on location using a high shear foam generator or may be shipped to the desired location.

Exemplary of an operation using the fluid is that wherein the crosslinking agent is introduced to an aqueous fluid containing the underivatized guar or guar derivative. Urea and, when used, the non-gaseous foaming agent and bifunctional organic compound, are then added to the fluid. While mixing, the carbon dioxide foaming gas is then introduced. Transport of hydrogen protons disassociated from the carbonic acid (with bicarbonate ions) to the crosslinked polymer is curtailed. Degradation of the crosslinked polymer is thereby delayed.

The fluid may be injected into a subterranean formation in conjunction with other treatments at pressures sufficiently high enough to cause the formation or enlargement of fractures or to otherwise expose the proppant material to formation closure stress. Such other treatments may be near wellbore in nature (affecting near wellbore regions) and may be directed toward improving wellbore productivity and/or controlling the production of fracture proppant.

EXAMPLES

The following examples are illustrative of some of the embodiments referenced herein. Other embodiments within the scope of the claims will be apparent to one skilled in the art from consideration of the description provided. It is intended that the specification, together with the examples, be considered exemplary only, with the scope and spirit of the disclosure being indicated by the claims which follow.

All percentages set forth in the Examples are given in terms of weight units except as may otherwise be indicated.

Figure 1:
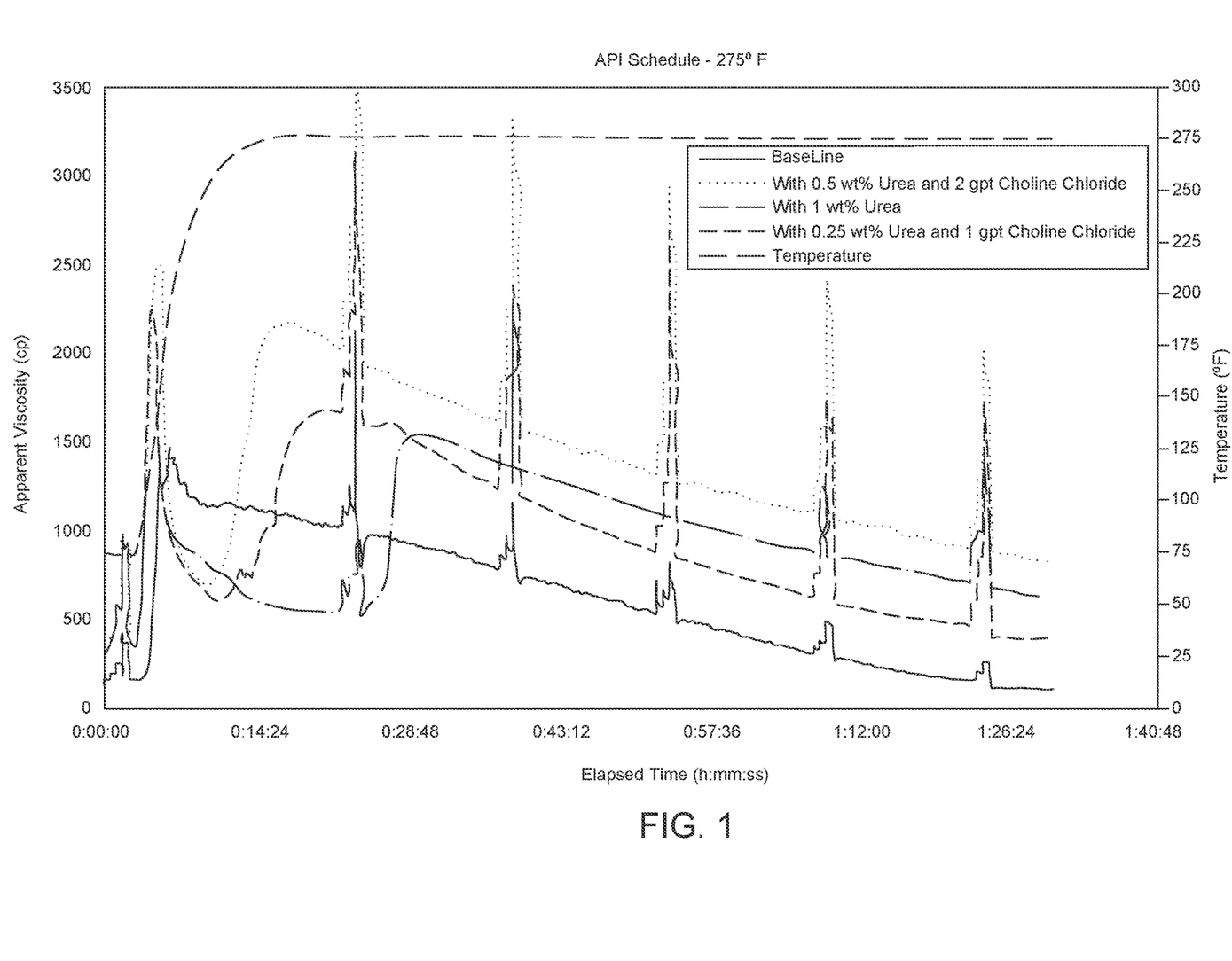
FIG. 1 illustrates improvement in thermal stability of a fluid prepared using tap water, carboxymethyl hydroxypropyl guar (CMHPG), a crosslinking agent, carbon dioxide gas, urea and a bifunctional organic compound containing at least one hydroxyl group and at least one quaternary ammonium group.

Example 1. A base fluid was prepared using tap water, 0.6 wt % CMHPG crosslinked with 1.75 gpt zirconium based crosslinking agent (XLW-60, a product of Baker Hughes), 4 gpt gel stabilizer, and carbon dioxide gas. Viscosity measurements following API RP 39 procedure were then conducted using a Chandler 5550 viscometer having an RIBS bob and cup assembly on the base fluid with and without varying concentrations of Urea and choline chloride. FIG. 1 shows addition of urea and the optional choline chloride improves the viscosity profile of the fracturing fluid. The viscosity remains higher than 300 cP for 1.5 hours at 275° F. at 0.25 wt % urea and 1 gpt choline chloride, 600 cP for 1.5 hours at 27 5° F. at 1 wt % urea and 0 gpt choline chloride, and 800 cP for 1.5 hours at 275° F. at 0.5 wt % urea and 2 gpt choline chloride.

Figure 2:
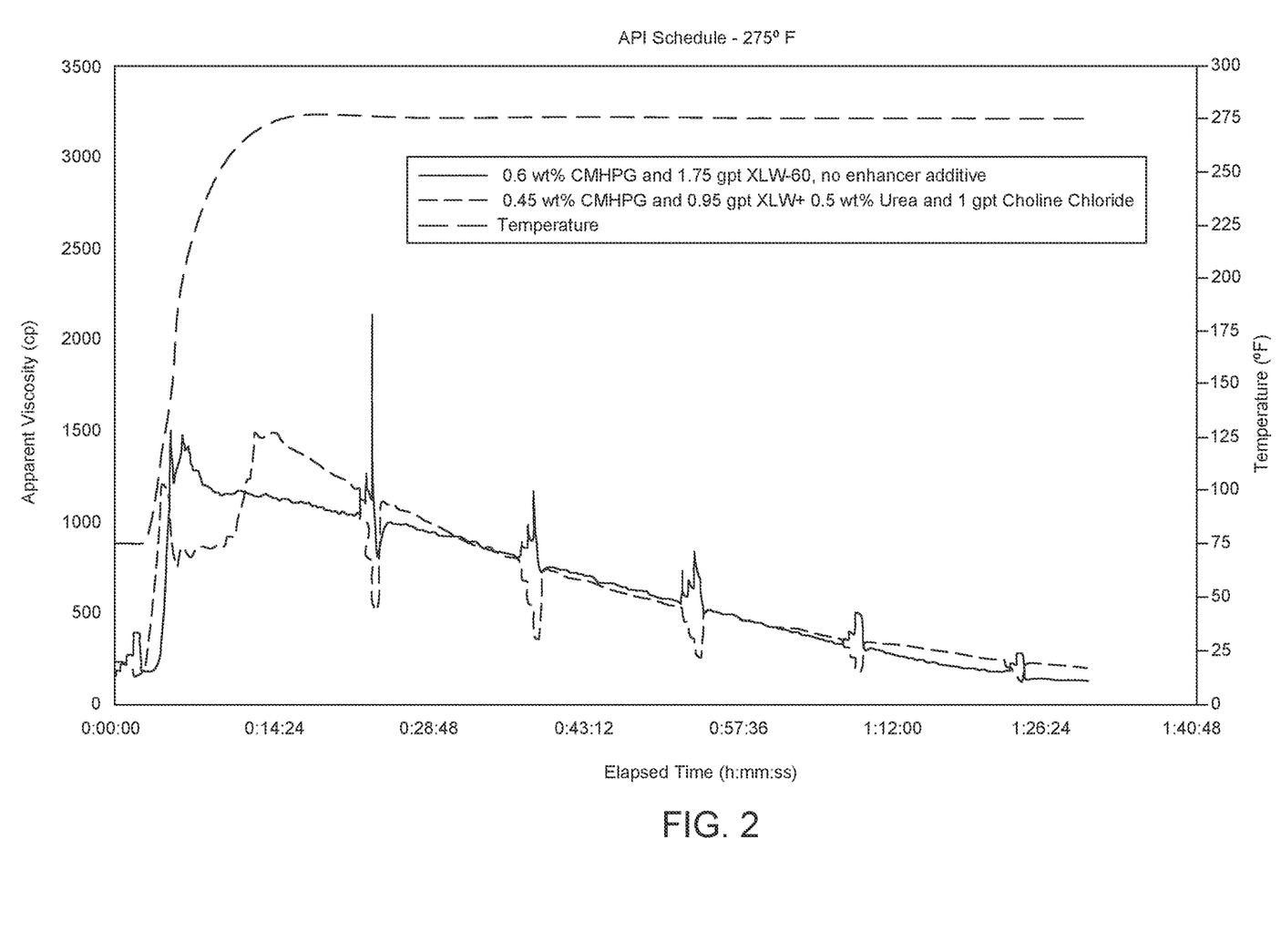
FIG. 2 illustrates viscosity profiles of a fluid of carboxymethyl hydroxypropyl guar (CMHPG), crosslinking agent, carbon dioxide gas, urea and a bifunctional organic compound, and a substantially similar fluid which does not contain urea or a bifunctional organic compound.

Example 2. Two energized fracturing fluids were prepared. Fluid A contained tap water, 0.45 wt % CMHPG crosslinked with 0.95 gpt XLW-60, 4 gpt gel stabilizer, carbon dioxide gas, 1 gpt choline chloride and 0.5 wt. % urea. Fluid B contained tap water, 0.6 wt % CMHPG crosslinked with 1.75 gpt XLW-60, 4 gpt gel stabilizer and carbon dioxide gas. The viscosity of Fluid A remained higher than 100 cP using the procedure of Example 1 for 1.5 hours at 275° F. whereas the viscosity of Fluid B remains higher than 100 cP for 1.5 hours at 275° F. but with the reduced CMHPG polymer loading and reduced crosslinking agent. The results are illustrated in FIG. 2 which demonstrates polymer loading reduction of 25% and crosslinker loading reduction of around 50% with Fluid A over Fluid B (wherein the polymer, crosslinking agent, gel stabilizer, and carbon dioxide were the same).

Embodiment 1. A fluid for use in treating a wellbore comprising (a) underivatized guar or a guar gum derivative selected from the group consisting of carboxyalkyl guars, hydroxyalkylated guars, modified hydroxyalkylated guars and mixtures thereof; (b) a crosslinking agent; (c) carbon dioxide; and (d) urea.

Embodiment 2. The fluid of embodiment 1, wherein the foaming gas further contains nitrogen.

Embodiment 3. The fluid of embodiment 1 or 2, further comprising a non-gaseous foaming agent.

Embodiment 4. The fluid of embodiment 3, wherein the non-gaseous foaming agent is selected from the group consisting of sulfate ethers, alkyl ether sulfates, ethoxylated ether sulfates, ammonium ether sulfates, phosphate esters, alkyl ether phosphates, ethoxylated alcohol phosphate esters, alkyl sulfates, alpha olefin sulfonates, alkyl quaternary ammonium salts, alkyl benzyl quaternary ammonium salts, alkyl amido amine quaternary ammonium salts and mixtures thereof.

Embodiment 5. The fluid of any of embodiments 1 to 4, wherein the guar gum derivative is a carboxyalkyl guar.

Embodiment 6. The fluid of embodiment 5, wherein the carboxyalkyl guar is carboxymethyl guar.

Embodiment 7. The fluid of any of embodiments 1 to 4, wherein the guar gum derivative is a hydroxyalkylated guar.

Embodiment 8. The fluid of embodiment 7, wherein the hydroxyalkylated guar is hydroxypropyl guar, hydroxyethyl guar, hydroxybutyl guar or a mixture thereof.

Embodiment 9. The fluid of any of embodiments 1 to 4, wherein the guar gum derivative is a modified hydroxyalkylated guar.

Embodiment 10. The fluid of embodiment 9, wherein the modified hydroxyalkylated guar is a carboxyhydroxyalkylated guar.

Embodiment 11. The fluid of embodiment 10, wherein he carboxyhydroxyalkylated guar is carboxymethyl hydroxypropyl guar.

Embodiment 12. The fluid of any of embodiments 1 to 11, further comprising a bifunctional organic compound containing at least one hydroxyl group and at least one quaternary ammonium group.

Embodiment 13. The fluid of embodiment 11 or 12, wherein the bifunctional organic compound is a hydroxyalkyl ammonium salt.

Embodiment 14. The fluid of embodiment 13, wherein the bifunctional organic compound is a hydroxyethyl ammonium salt.

Embodiment 15. The fluid of embodiment 13 or 14, wherein the bifunctional organic compound is trimethyl hydroxyethyl ammonium chloride or choline chloride or a combination thereof.

Embodiment 16. The fluid of embodiment 15, wherein the bifunctional organic compound is choline chloride.

Embodiment 17. The fluid of any of embodiments 1 to 14, wherein the hydroxyalkyl ammonium salt is bis(hydroxyethyl)dimethyl ammonium chloride.

Embodiment 18. The fluid of embodiments 13, wherein the hydroxyalkyl ammonium salt is of the structure (I):

R = ethyl, butyl, hexyl, dodecyl, octadecyl and n is from about 1 to about 3.

Embodiment 19. The fluid of any of embodiments 1 to 18, wherein the pH of the fluid is below 6.0.

Embodiment 20. The fluid of embodiment 19, wherein the pH of the fluid is from about 3.0 to about 4.8.

Embodiment 21. A method of fracturing a subterranean formation penetrated by a well comprising the steps of pumping the fluid of any of embodiments 1 to 20 into a well under pressure and creating or enlarging a fracture in the formation.

Embodiment 22. A method of fracturing a subterranean formation penetrated by a well comprising the steps of: (a) forming the fluid of any of embodiments 1 to 20; and (b) creating or enlarging a fracture in the subterranean formation by pumping the fluid of step (a) down the well under pressure.

Embodiment 23. The method of embodiment 21 or 22, wherein the pH of the fluid less than or equal to 5.0.

Embodiment 24. The method of any of embodiments 21 to 23, wherein the guar gum derivative is selected from the group consisting of carboxyalkyl guars, hydroxyalkylated guars carboxyhydroxylated guars and mixtures thereof.

Embodiment 25. A method of fracturing a subterranean formation penetrated by a well comprising the steps of: (a) pumping the fluid of any of embodiments 3 to 20 into a well under pressure and creating or enlarging a fracture in a subterranean formation penetrated by the well, wherein during or subsequent to pumping the fluid into the well a viscous gel is formed by crosslinking the underivatized guar or guar gum derivative with the crosslinking agent; and (b) delaying degradation of the crosslinked viscous gel in-situ by limiting transport of hydrogen protons disassociated from the carbonic acid to the crosslinked viscous gel with the urea and wherein the formation temperature in the well is greater than or equal to 250° F.

Embodiment 26. The method of embodiment 25, wherein the fluid has a pH less than or equal to 6.0.

Embodiment 27. The method of embodiment 25 or 26, wherein the guar gum derivative is selected from the group consisting of carboxyalkyl guars, hydroxyalkylated guars, carboxyhydroxylated guars and mixtures thereof.

What is claimed is:

1. A method of fracturing a subterranean formation penetrated by a well, the subterranean formation having a temperature greater than 250° F., the method comprising the steps of:
(A) pumping a fluid into the well under pressure and creating or enlarging a fracture in the formation, the fluid comprising:
  (a) underivatized guar or a guar gum derivative selected from the group consisting of carboxyalkyl guars, hydroxyalkylated guars, modified hydroxyalkylated guars and mixtures thereof;
  (b) a crosslinking agent;
  (c) carbon dioxide as foaming gas;
  (d) urea; and
  (e) a bifunctional organic compound having at least one hydroxyl group and at least one quaternary ammonium group;
(B) forming a foamed crosslinked viscous gel in-situ from the underivatized guar or guar gum derivative and the crosslinking agent and the carbon dioxide foaming gas;
(C) generating carbonic acid from the carbon dioxide foaming gas;
(D) decreasing transport of disassociated protons from the generated carbonic acid to the crosslinked viscous gel with the urea and the bifunctional organic compound;
(E) inhibiting degradation of the crosslinked viscous gel with the urea and the bifunctional organic compound; and
(F) maintaining thermal stability within the well.

2. The method of claim 1, wherein the foaming gas further comprises nitrogen.

3. The method of claim 1, the foamed fluid further comprising a non-gaseous foaming agent.

4. The method of claim 3, wherein the non-gaseous foaming agent is selected from the group consisting of sulfate ethers, alkyl ether sulfates, ethoxylated ether sulfates, ammonium ether sulfates, phosphate esters, alkyl ether phosphates, ethoxylated alcohol phosphate esters, alkyl sulfates, alpha olefin sulfonates, alkyl quaternary ammonium salts, alkyl benzyl quaternary ammonium salts, alkyl amido amine quaternary ammonium salts and mixtures thereof.

5. The method of claim 1, wherein the guar gum derivative is carboxymethyl guar, hydroxypropyl guar, hydroxyethyl guar, hydroxybutyl guar or a mixture thereof.

6. The method of claim 1, wherein the guar gum derivative is a carboxyhydroxyalkylated guar.

7. The method of claim 6, wherein the carboxyhydroxyalkylated guar is carboxymethyl hydroxypropyl guar.

8. The method of claim 1, wherein the bifunctional organic compound is a hydroxyalkyl ammonium salt.

9. The method of claim 8, wherein the bifunctional organic compound is a hydroxyethyl ammonium salt, trimethyl hydroxyethyl ammonium chloride, choline chloride or a combination thereof.

10. The method of claim 9, wherein the bifunctional organic compound is choline chloride.

11. The method of claim 8, wherein the hydroxyalkyl ammonium salt is bis(hydroxyethyl)dimethyl ammonium chloride.

12. The method of claim 8, wherein the bifunctional organic compound is a hydroxyalkyl ammonium salt of the structure (I):

R = ethyl, butyl, hexyl, dodecyl, octadecyl and n is from about 1 to about 3.

13. The method of claim 1, wherein the pH of the fluid is below 6.0.

14. The method of claim 1, wherein the fluid pumped into the well in (A) is an energized fluid.

15. The method of claim 1, wherein the formation temperature in the well is in excess of 275° F.

16. The method of claim 15, wherein the formation temperature in the well is in excess of 350° F.

17. The method of claim 1, wherein the weight percent or volume percent of urea to bifunctional organic compound in the fluid pumped into the well in (A) is between from about 0.05:1.25 to about 0.4:0.6.

18. A method of fracturing a subterranean formation penetrated by a well, the subterranean formation having a temperature in excess of 225° F., the method comprising the steps of:
(a) forming a an energized fluid comprising (i) underivatized guar or a guar gum derivative selected from the group consisting of carboxyalkyl guars, hydroxyalkylated guars, modified hydroxyalkylated guars and mixtures thereof; (ii) a an organometallic crosslinking agent; (iii) carbon dioxide as foaming gas; and (iv) urea; and (v) a bifunctional organic compound selected from the group consisting of a hydroxyethyl ammonium salt, trimethyl hydroxyethyl ammonium chloride, choline chloride or a combination thereof, wherein the weight percent or volume percent of urea to bifunctional organic compound is between from about 0.05:1.25 to about 0.4:0.6;

(b) creating or enlarging a fracture in the subterranean formation by pumping the energized fluid of step (a) down the well under pressure;

(c) generating carbonic acid from the carbon dioxide foaming gas;

(d) forming a foamed viscous gel during or subsequent to pumping the energized fluid into the well by crosslinking the underivatized guar or guar gum derivative with the crosslinking agent;

(e) minimizing transport of hydrogen protons dissociated from the carbonic acid with the urea of the energized fluid;

(f) delaying degradation of the crosslinked viscous gel when the formation temperature in the well is greater than or equal to 225° F. with the urea; and (g) maintaining thermal stability within the well with the bifunctional organic compound.

19. A method of fracturing a subterranean formation penetrated by a well, the subterranean formation having a temperature greater than 275° F., the method comprising the steps of:

(A) pumping an energized fluid into a well under pressure and creating or enlarging a fracture in the formation, the energized fluid comprising:
  (i) underivatized guar or a guar gum derivative;
  (ii) a crosslinking agent;
  (iii) carbon dioxide as foaming gas;
  (iv) urea; and
  (v) a hydroxyalkyl ammonium salt;

(B) forming a foamed crosslinked viscous gel in-situ;

(C) generating carbonic acid from the carbon dioxide foaming gas;

(D) decreasing transport of disassociated protons from the generated carbonic acid to the crosslinked viscous gel with the urea;

(E) inhibiting degradation of the crosslinked viscous gel with the urea while the temperature in the well is greater than 275° F.; and (F) maintaining thermal stability within the well with the hydroxyalkyl ammonium salt in the energized fluid.

20. The method of claim 19, wherein the hydroxyalkyl ammonium salt is choline chloride.

* * * * *